UNITED STATES PATENT OFFICE.

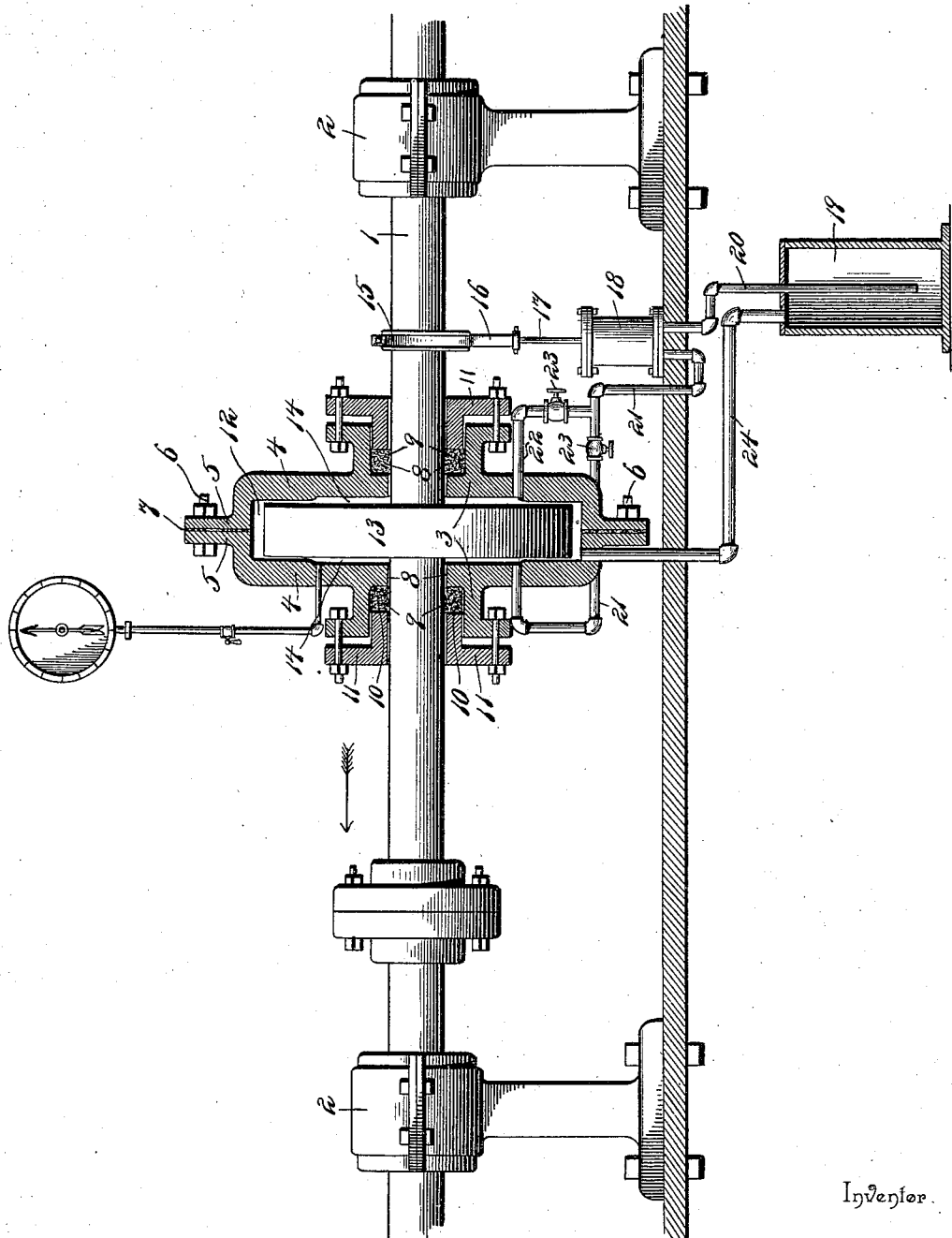

OREN F. COOK, OF SAN JOSÉ, CALIFORNIA.

THRUST-BEARING FOR PROPELLER-SHAFTS.

SPECIFICATION forming part of Letters Patent No. 594,462, dated November 30, 1897.

Application filed January 19, 1897. Serial No. 619,781. (No model.)

*To all whom it may concern:*

Be it known that I, OREN F. COOK, a citizen of the United States, residing at San José, in the county of Santa Clara and State of California, have invented a new and useful Thrust-Bearing for Propeller-Shafts, of which the following is a specification.

This invention relates to thrust-bearings for horizontal shafts, such as the propeller-shaft of a steamer, its object being to provide an oil-cushion to receive the thrust of the shaft, the oil for forming the cushion being constantly circulated and kept under pressure against a collar on the shaft.

With this object in view my invention consists in the construction and combination of parts hereinafter fully described, and particularly pointed out in the claims.

The drawing represents a side elevation of a portion of a propeller-shaft provided with my improved thrust-bearing, the latter being partly in section.

Similar numerals of reference designate corresponding parts in the drawing.

1 represents the propeller-shaft, supported in bearings 2 in any usual and approved manner.

3 represents an annular casing made of two dish-shaped sections 4, each having a peripheral flange 5, said flanges being perforated for the reception of bolts 6, by means of which they are firmly secured together, a suitable packing 7 being interposed between the flanges to make a tight joint. Each section is centrally perforated, as indicated at 8, for the reception of the shaft 1, and each is provided with a stuffing-box 9 for the reception of the packing 10 around the shaft 1, the stuffing-boxes having the usual followers 11, bolted to them in the ordinary manner. The annular chamber 12, formed between the two sections 4, incloses the collar 13, which is rigid on the shaft 1. The collar 13 is of somewhat less diameter than that of the chamber 12 and also of a width less than that of the chamber in order that the collar may revolve in the chamber without coming in contact with it at any point. The central portion of the inner face of each section 4 is cored out to form the annular recesses 14, said recesses being of a diameter less than that of the collar 13, so that when the collar engages the inner face of either section the recess in such section will form a closed chamber, of which the face of the collar will be one wall.

The shaft 1 is provided with an eccentric 15, the strap 16 of which is connected to the piston-rod 17 of an ordinary force-pump 18.

19 represents an oil-tank, which may be located in any desirable position on the vessel, and a pipe 20 leads from the tank to the pump. From the pump another pipe 21 leads to one of the recesses 14, and from this pipe 21 a branch pipe 22 leads to the other recess 14, and the pipe 21 and the branch 22 are provided with shut-off valves 23 of any approved pattern. From the lower part of the chamber 12 a discharge-pipe 24 leads to the oil-tank 19. This pipe 24 is preferably of a diameter somewhat larger than that of the pipe 21 and its branch 22, in order that the oil may be freely circulated without subjecting the pump and supply-pipes to unnecessary strain.

It is of course to be understood that the pipes 20 and 21 are provided with suitable valves at their connection with the pump to permit ingress of the oil and egress from the pump-cylinder in the proper manner. It is also to be understood that the casing 3 is firmly secured to the vessel in an approved manner; but I have not deemed it necessary to show the connecting devices.

25 indicates a pressure-gage for the purpose of indicating the pressure within the casing 3.

The operation of the device is as follows: Assuming the vessel is being propelled in the direction of the arrow, the thrust of the collar 13 will be toward the left-hand section of the casing, and it will normally tend to engage the inner face of the said section. Under these conditions the valve in the branch pipe 22 will be closed and that in the pipe 21 open, and the pump being operated by the revolution of the shaft will force the oil from the tank to the recess 14, and as long as the collar 13 is in frictional engagement with the face of the section the oil cannot escape from the recess, and it will accordingly accumulate therein under pressure until sufficient force is generated to force the collar 13 away from the face of the section 4, when the oil in the recess will escape in a thin film between them into the chamber 12 and thence by the pipe 24 to the tank 19. It is therefore apparent that the oil will be constantly supplied to the recess 14 and maintained therein at such pressure as to form an oil-cushion and keep the collar out of frictional engagement with the inner face of the section 4, and also that the oil will be constantly circulated through the casing 3. It is also apparent that should the collar come into frictional engagement with the inner face of the casing it will quickly be forced therefrom. When the vessel is propelled in the opposite direction, the valve in the pipe 21 will be closed and that in the branch 22 opened.

Having described the invention, what is claimed as new is—

1. In a thrust-bearing, the combination with the shaft and the collar rigid thereon, of a casing inclosing the collar, the chamber of said casing being of larger dimensions than the collar to permit the latter to rotate therein without frictional contact, said casing having annular recesses in its opposite faces, said recesses being of less diameter than that of the collar and each forming a closed chamber when the collar frictionally engages the inner face of the casing in which said recess is formed, an oil-tank, a pump operated by the shaft and having a pipe connection with the tank, a pipe leading from the pump to said recesses, and a pipe leading from the interior of the casing to the tank, substantially as and for the purpose specified.

2. In a thrust-bearing, the combination with the shaft and the collar rigid thereon, of a casing inclosing the collar, the chamber of said casing being of larger dimensions than the collar to permit the latter to rotate therein without frictional contact, said casing having annular recesses in its opposite faces, said recesses being of less diameter than that of the collar and each forming a closed chamber when the collar frictionally engages the inner face of the casing in which said recess is formed, and means substantially as described to circulate oil under pressure through the chamber and cause it to accumulate in the recesses, whereby an oil-cushion is formed, substantially as and for the purpose described.

3. In a thrust-bearing, the combination with the shaft and the collar rigid thereon, of a casing inclosing the collar, the chamber of said casing being of greater diameter than the collar to leave an annular space between them, said casing having a recess formed in the inner face thereof at each side of the collar, an oil-tank, a pump operated by the shaft, a pipe leading from the tank to the pump, pipes leading from the pump to said recesses, valves in the last-named pipes to control the flow of oil therethrough, and a return-pipe leading from the annular space in the casing to the oil-tank, the construction being such that by operating the said valves the oil can be pumped to either of the recesses and pass into the said annular space to be returned to the tank, substantially as described.

In testimony that I claim the foregoing as my own I have hereto affixed my signature in the presence of two witnesses.

OREN F. COOK.

Witnesses:
C. H. SIMONDS,
JULIA BODLEY.